COMBINATION TELEPHONE FIRE ALARM AND METER READING SYSTEM

Filed Feb. 27, 1967 6 Sheets-Sheet 1

Roger C. Glidden
INVENTOR.

BY Clarence A. O'Brien and Harvey B. Jacobson
Attorneys

COMBINATION TELEPHONE FIRE ALARM AND METER READING SYSTEM

Filed Feb. 27, 1967 6 Sheets-Sheet S

Roger C. Glidden
INVENTOR.

BY Clarence A. O'Brien
and Harvey B. Jacobson
Attorneys

COMBINATION TELEPHONE FIRE ALARM AND METER READING SYSTEM

Filed Feb. 27, 1967

Roger C. Glidden
INVENTOR.

BY Clarence A. O'Brien
and Harvey B. Jacobson
Attorneys

June 25, 1968 R. C. GLIDDEN 3,390,234

COMBINATION TELEPHONE FIRE ALARM AND METER READING SYSTEM

Filed Feb. 27, 1967 6 Sheets-Sheet 4

Roger C. Glidden
INVENTOR.

BY Clarence A. O'Brien
and Harvey B. Jacobson
Attorneys

COMBINATION TELEPHONE FIRE ALARM AND METER READING SYSTEM

Roger C. Glidden
INVENTOR.

BY Clarence A. O'Brien
and Harvey B. Jacobson
Attorneys

Roger C. Glidden
INVENTOR.

BY Clarence A. O'Brien and Harvey B. Jacobson
Attorneys

United States Patent Office
3,390,234
Patented June 25, 1968

3,390,234

COMBINATION TELEPHONE FIRE ALARM AND METER READING SYSTEM

Roger C. Glidden, Wenham, Mass., assignor to The Glidden Electric Corporation, a corporation of Massachusetts Continuation-in-part of application Ser. No. 430,431, Feb. 4, 1965. This application Feb. 27, 1967, Ser. No. 618,602
20 Claims. (Cl. 179—5)

ABSTRACT OF THE DISCLOSURE

A data reporting and recording system utilizing commercial telephone lines to detect fire and read meters at reporting stations and transmit the information to fire stations and data collecting centers by automatic dialing and information transmitting equipment powered by the telephone system itself.

This invention relates to the monitoring of a plurality of conditions at reporting stations and the recording of such conditions at a remote receiving station utilizing the principles of an automatic dialing system as disclosed in my prior copending application, U.S. Ser. No. 430,431, filed Feb. 4, 1965, with respect to which the present application is a continuation-in-part. More particularly, the invention contemplates the automatic reporting and recording of fire alarms, unauthorized entry, consumption of gas, water, electrical energy and other such conditions.

One of the important objects of the present invention is to provide a telephone reporting system capable of monitoring conditions of both an emergency and a non-emergency nature. The system is extremely reliable in operation because it relies on electrical energy from the telephone lines as the source of power through which the basic functions of the system are performed. Other power operated devices associated with the system are independently powered without imposing any power drain on the telephone lines. Thus, the system is rendered operative utilizing a minimum amount of power derived from the telephone lines without however, disturbing normal telephone service.

In accordance with the foregoing object, changes in the voltage that appear across the telephone lines under control of automatic equipment associated with the telephone communication system, are utilized in programming operation of the reporting system with the power for developing the control signals being derived from the telephone lines while power operated devices such as alarms, timers, code wheels, tape recorders are independently powered.

A further object of the present invention in accordance with the foregoing objects, is to provide an automatic transmitter associated with a telephone communication system at a reporting station having a plurality of condition monitoring devices including heat sensors and meter reading devices. The transmitter is capable of distinguishing between condition monitoring devices of an emergency nature such as heat sensors and of a non-emergency nature such as meter reading devices in order to either disconnect the telephone instrument from the message lines to permit immediate reporting of an emergency condition or disconnect the telephone instrument only when not in use to report a non-emergency condition. The system of the present invention is therefore so arranged as to require manual reset of the transmitter at the reporting station once an emergency is reported but automatic reset when a non-emergency condition is reported. Further, while the reporting of an emergency situation interrupts normal telephone service by disconnecting the telephone instrument, there is no interruption in the normal use of the telephone for non-emergency purposes.

The system of the present invention also has optionally associated therewith an alarm alerting device at the reporting station which is set into operation whenever an emergency situation is being reported. The alarm device is triggered into operation either by signal energy derived from the power lines or by signal energy derived from a storage battery maintained in a charged condition by energy derived from the telephone lines. An operational indicator may also be provided in order to signify whether or not the emergency situation is being reported during operation of the alarm device.

In accordance with the foregoing objects, a receiver component is provided at a receiving station through which information is recorded and a cycle control signal dispatched back to the reporting station restoring the transmitter to a quiescent condition once the information has been recorded. Facilities are provided in connection with the receiver to prevent false triggering thereof as well as to record any periods of line voltage failure during which no report could have been received from the reporting stations.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a schematic block diagram illustrating the general arrangement of the system of the present invention.

FIGURES 2*a* and 2*b* form an electrical circuit diagram of the transmitter component associated with the system of the present invention.

FIGURES 3*a* and 3*b* form an electrical circuit diagram conforming to the receiver component of the system.

*General arrangement*

Figures 1, 9, 10:
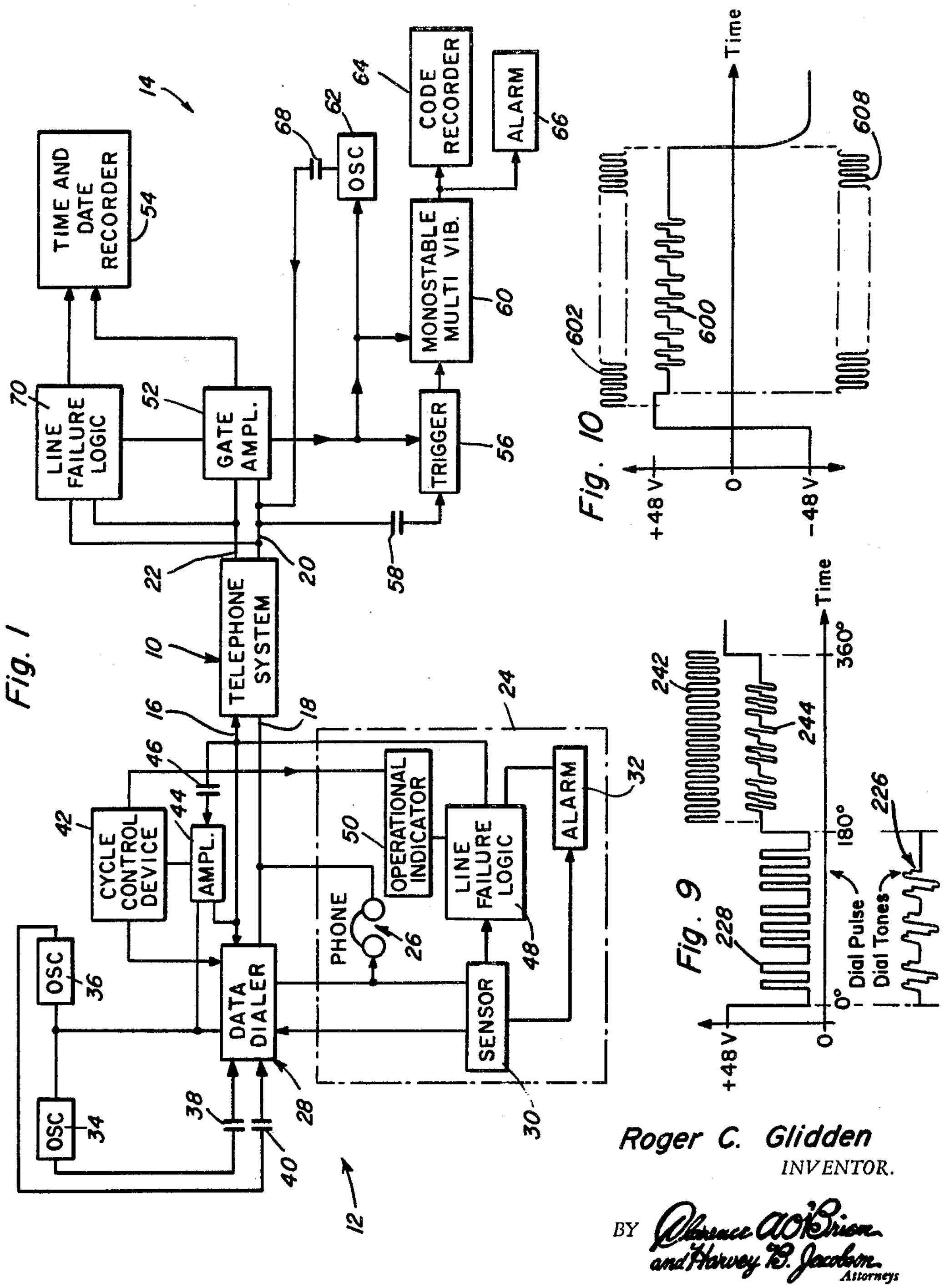
FIGURE 9 is a graphical illustration of the signals dispatched from the reporting station.
FIGURE 10 is a graphical illustration of the signals received and dispatched at the receiving station.

FIGURE 1 diagrammatically illustrates a telephone system generally referred to by reference numeral 10 through which telephone message lines interconnect telephone instruments at remote stations. Two such remote stations are shown in FIGURE 1 by way of example with a transmitter generally referred to by reference numeral 12 at one of these stations referred to as the reporting station and a receiver generally referred to by reference numeral 14 at the other station referred to as the receiving station. It will be appreciated of course that a plurality of reporting stations may be interconnected through the telephone system with each receiving station and that there may be a plurality of different receiving stations with which each reporting station may communicate. The transmitter 12 at each reporting station is connected to the telephone system through the usual telephone message lines 16 and 18 while telephone message lines 20 and 22 connect the telephone system to the receiver 14 at the receiving station.

Commercial telephone communication systems now in use have certain operational characteristics utilized by the system of the present invention. For example, in a quiescent state, a predetermined D.C. voltage is maintained across the telephone message lines of 48 volts. Whenever the telephone lines are loaded at the reporting station in order to initiate dialing, the voltage across the telephone lines automatically drops to a low value of 4 volts for example under control of the equipment associated with the telephone system in order to enable a dial tone signal to appear across the lines. The foregoing voltage change constitutes an intrinsic operating characteristic of one form of telephone system upon which functioning of the present invention depends.

With continued reference to FIGURE 1, it will be observed that the transmitter 12 may include components located within a residence for example generally denoted by reference numeral 24 while other components may be located outside in order to facilitate servicing. Associated with the transmitter components within the residence, is the usual telephone instrument 26 adapted to be connected across the message lines 16 and 18 through a programming mechanism generally referred to by reference numeral 28. The connection of the telephone instrument across the message lines may be interrupted however in response to detection of an emergency condition such as fire by means of a heat sensor component 30 which is then also operative to initiate operation of an alarm device 32 suitably mounted in the residence 24. At the same time, the mechanism 28 is set into operation in order to automatically dial the receiving station by dispatch of a train of signal pulses to the telephone system 10 through the message lines 16 and 18. As will be explained hereafter, the system of the present invention may accommodate either pulse contact or touch tone types of dialing operations. Thus, dialing information as well as coded information identifying the location and type of condition being reported may be derived from a pair of electronic oscillators 34 and 36 the outputs of which are applied through coupling capacitors 38 and 40 and the mechanism 28 to the message lines 16 and 18 from which power for operating the oscillators is also derived. Dialing operation of the mechanism 28 may also be initiated by a non-emergency type of condition as will be hereafter explained, in which case the mechanism 28 waits until the telephone instrument 26 is idle. Only if the telephone instrument 26 remains in a hang-up position will mechanism 28 recycle to complete a reporting operation. Thus, when information is being recorded at the receiving station, a cycle control signal is dispatched from the receiving station to the reporting station. This signal is recognized by a frequency tuned amplifier 44, the input of which is coupled by coupling capacitor 46 to the telephone lines so as to supply an amplified output to the mechanism 28 through which recycling is prevented. It will be appreciated therefore, that the transmitter will recycle until such time as the information being reported has been received at the receiving station. Should the transmitter fail to report because of line voltage loss, this situation will be detected by a line failure logic 48 in order to inform persons of the situation through the operational indicator 50. Also, the line failure logic 48 will function to render the alarm device 32 operative when triggered by the sensor 30 even though no voltage is available across the telephone message lines.

The receiving station may be a municipal fire company and/or a data collection center for a power utility. Once the receiving station has been dialed by a transmitter from a reporting station, the receiver 14 at the receiving station is operatively connected to the transmitter 12 through the telephone system 10. A gating signal from the transmitter is then recognized by a frequency tuned amplifier 52 in the receiver, the output of which is operative through a time and date recorder 54 to record the instant at which the reporting station began to report. The reported information in the form of coded signals is applied to the input of a trigger component 56 through a coupling capacitor 58 connected to the message lines. The trigger component 56 as well as the monostable multivibrator 60 and oscillator 62 are rendered operative through the amplifier 52 by energy derived from the telephone message lines. The coded signals received from the reporting station through the message lines are converted into triggering pulses by the trigger component 56 in order to intermittently switch the multivibrator 60 to its unstable state producing output pulses recorded by the code recorder 64 and at the same time initiating an alarm signal through the alarm component 66 if desired. The oscillator 62 is rendered operative in order to dispatch a cycle control signal applied through the capacitor 68 to the message lines. This cycle control signal is received at the reporting station and is operative to terminate cyclic operation of the mechanism 28 at its starting position only. Further, should the receiver fail to record the coded information because of any line failure at the receiving station, occurrence of such line failure will be recorded by the recorder 54. Toward this end, a line failure logic 70 is connected across the mesage lines 20 and 22 and is connected to the recorder 54 in order to record when line voltage failure had occurred and when voltage across the message lines is regained.

*Dialing and message control circuits*

Figure 2A:
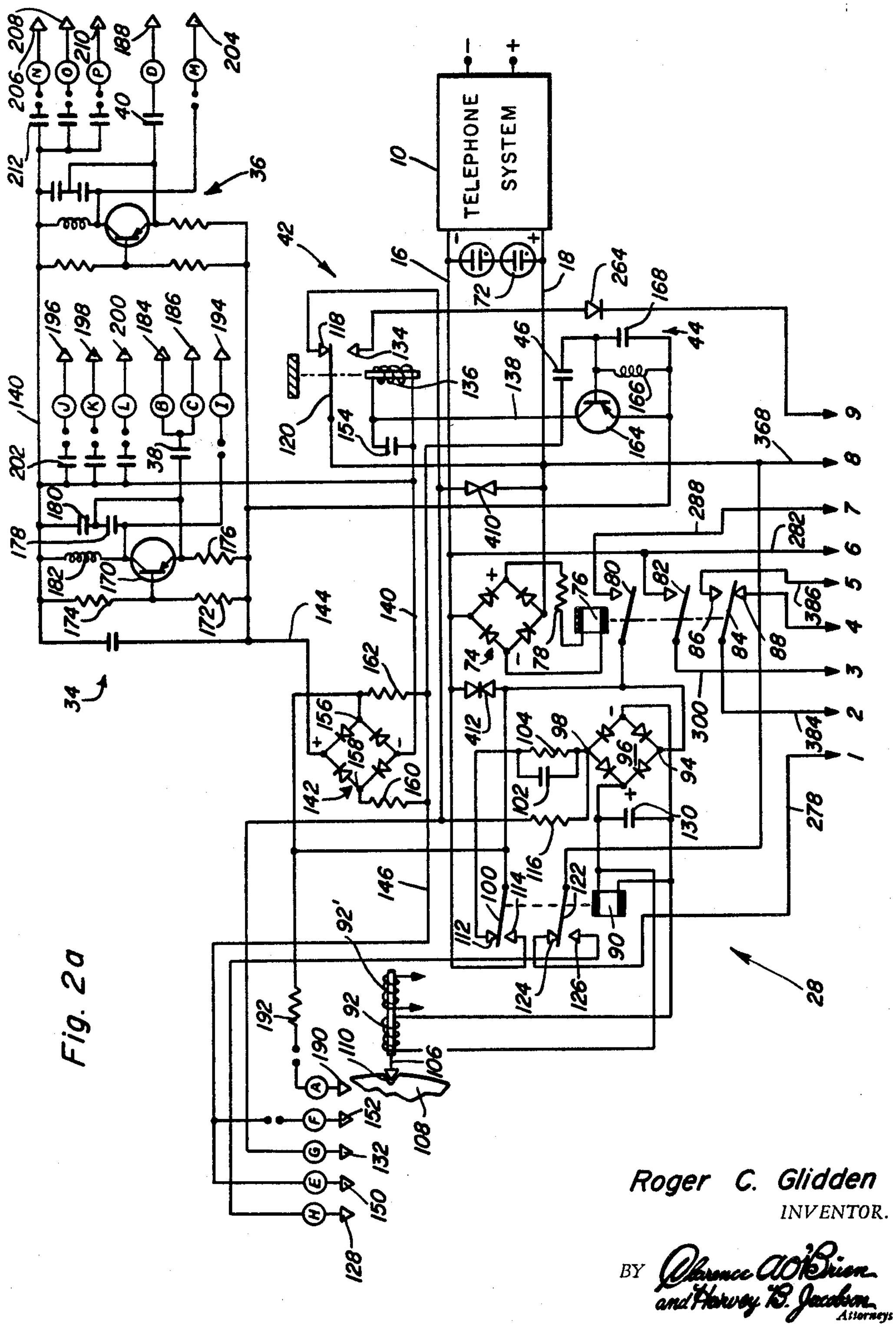
Figure 2B:
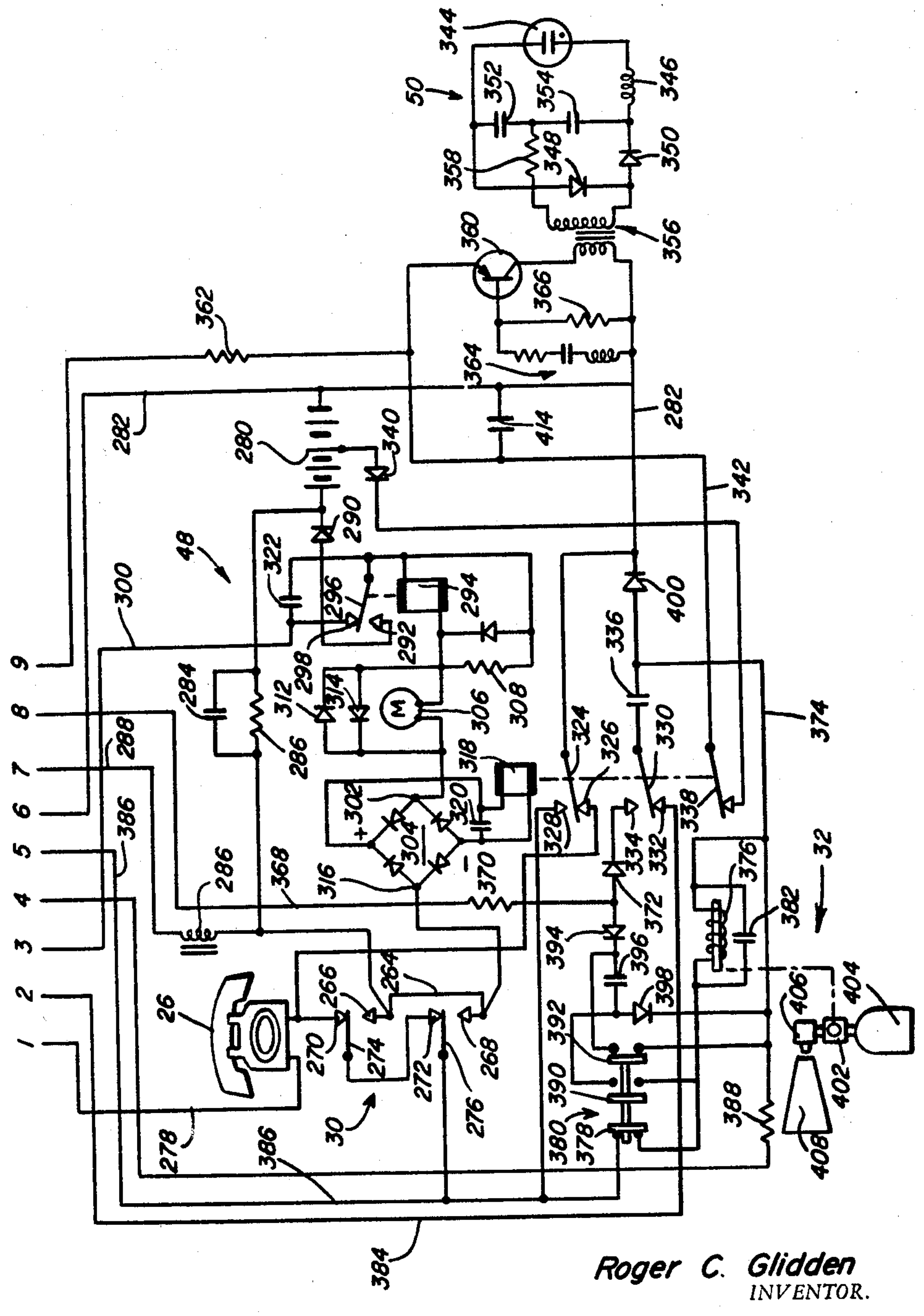

Referring now to FIGURE 2*a*, it will be noted that neon lamps 72 are connected across the telephone message lines 16 and 18 in order to limit voltage across the various components of the transmitter for protection purposes. The message lines are directly connected to the input terminals of a full wave rectifier 74 from which a D.C. voltage is applied across the terminals of a line monitoring relay coil 76 through voltage reducing resistor 78. In both FIGURES 2*a* and 2*b*, all relays are shown in a deenergized condition. When a relatively high voltage appears across the message lines during quiescent conditions, the line monitoring relay coil 76 will be energized in order to close the normally opened relay switches 80 and 82 associated therewith as well as to displace relay switch 84 into engagement with contact 86 and out of engagement with contact 88. The line monitoring relay therefore functions to render the line failure logic 48 operative as will be hereafter explained. Should the line voltage drop below 3 volts indicative of line voltage failure, relay coil 76 is deenergized to isolate the alarm circuit 32 from the telephone lines and activate the operational indicator 50 as will be hereafter explained. A brake element 106 is also diagrammatically shown in FIGURE 2*a* which is biased into brake engagement. The brake element is released from brake engagement by energization of any one of a plurality of brake release coils corresponding to the different conditions being monitored at the reporting station. By way of example, only two release coils 92 and 92′ are shown and a complete circuit associated with coil 92 only is illustrated in FIGURES 2*a* and 2*b*. Dialing operation of the mechanism 28 is begun by energization of one of the brake release solenoids 92, 92′ by a high voltage to withdraw the brake element 106 from a driven code number 108 with which a plurality of contacts are engaged. The code member may be driven by means of a spring-wound type of motor as disclosed in connection with the code disk described in my prior copending application aforementioned. The code member will be stopped only in a starting position by the brake element 106 biased into engagement with a notch 110 formed in the code member for this purpose. Withdrawal of the brake element in response to an emergency signal causing energization of release coil 92 or a non-emergency signal causing energization of release coil 92′ will therefore release the code member for rotation through at least one complete cycle. The code member may of course recycle continuously until the energy stored in its spring motor is exhausted if the brake release solenoid 92 for example and its associated relay coil 90 connected in parallel therewith are maintained energized. Toward this end, energization of the relay coil 90 displaces relay switch 100 from contact 112 into engagement with contact 114 connected to the telephone message line 16. Line 16 is thereby connected through relay switch 100 to the input terminal 94 of rectifier 96 bypassing those portions of the system including the sensor 30 that are susceptible to fire damage. The other input terminal 98 of rectifier 96 is connected through the voltage reducing resistor 116 to the contact 118 normally engaged by the switch element 120 in the cycle control device 42, the switch element 120 being connected to the telephone message line 18. Thus, actuation of the relay switch 100 establishes a relay holding circuit for maintaining the relay coil 90 and brake release solenoid 92 energized as long as switch element 120 engages contact 118. The relay switch 122 controlled by relay coil 90, and the contacts 124 and 126 associated therewith alternatively connect the telephone message line 18 to the telephone instrument 26 and one of the contacts 128 engaged with the driven code member 108 in order to simultaneously disconnect the telephone instrument 26 from the message lines and transmit dialing and coded information be triggered by the heat sensor component as will be hereafter explained.

Capacitor 130 is connected across the output terminals of the rectifier 96 so that it will be charged by the voltage applied to the relay coil 90 and brake release solenoid 92 to prevent relay chatter by transients produced during the dialing operation. As the code member 108 approaches the end of its rotational cycle, contact 132 will open in order to interrupt the relay holding circuit unless the switch element 120 is engaged with the contact 118 to maintain the relay holding circuit closed as aforementioned. To prevent recycling therefore, switch element 120 is displaced from engagement with contact 118 into engagement with contact 134 interrupting the relay holding circuit during a hang-up period when contact 132 is opened as the code member 108 approaches the end of its rotational cycle. The switch element 120 is displaced out of engagement with contact 118 during a message transmitting period by energization of a latching solenoid coil 136 connected at one terminal to the output of amplifier 44 through conductor 138. The other terminal of the solenoid coil 136 is connected by conductor 140 to the negative output terminal of a full wave rectifier 142, the positive output terminal of which is connected to the oscillators 34 and 36 and the amplifier 44 through conductor 144 in order to furnish operating energy to the latter components. The amplifier receives its input from the message lines through input coupling capacitor 46 connected by conductor 146 to the contacts 150 and 152 engaged with the code member 108. Thus, a cycle control signal received from the receiving station will be amplified by the amplifier in order to energize coil 136 shunted by filter capacitor 154 to engage the latching solenoid as the end of a cycle is approached.

The rectifier 142 from which a D.C. voltage is applied to the oscillators and the amplifier, obtains its energy from the telephone lines. Toward this end, the input terminal 156 of rectifier 142 is connected through relay switch 100 to the telephone line 16 when relay coil 90 is energized while the other input terminal 158 is connected through voltage reducing resistor 160 and conductor 146 to the contact 150 or 152 associated with the code member. A current regulating resistor 162 also connects the conductor 146 to the input terminal 156. Thus, when movement of the code member 108 is initiated, a positive voltage will be applied to the amplifier and to the oscillators through conductor 144 and a negative voltage applied through conductor 140 to the solenoid coil 136 and to the oscillators. The amplifier includes a transistor 164 of the PNP type having an emitter biased by the positive voltage applied to conductor 144, and an output collector connected by conductor 138 to the solenoid coil 136. An LC network consisting of an inductor 166 and capacitor 168 interconnects the input base and emitter of the transistor so that only a signal within a narrow frequency range will produce an amplified output voltage at the collector capable of energizing the solenoid coil 136. Thus, only a proper signal received from the receiving station indicative of successful reporting will automatically reset the transmitter to its quiescent condition by terminating movement of the code control member 108 at its start position.

Except for the output frequency values, the oscillators 34 and 36 are similar in arrangement and operation and include PNP types of transistors 170. Each transistor includes a base maintained at a proper bias by the voltage dividing resistors 172 and 174 connected between the positive and negative voltage lines 144 and 140 from the rectifier 142 to lower the output impedance of the oscillator by conducting some negative feedback. An emitter resistor 176 connects the positive voltage line to the emitter of the transistor in order to establish proper bias for the output emitter element and load the resonant tank circuit through which positive feedback is conducted including capacitor 178, capacitor 180 and inductor 182 connecting the collector to the negative voltage line 140. The oscillating output of oscillator 34 from the emitter of transisor 170 is therefore fed through coupling capacitor 38 and the contacts 184 and 186 to the telephone message lines as will be hereafter explained in further detail. Thus, the continuous output of oscillator 36 at one frequency is applied through contact 188 to the telephone message lines in order to provide a gating signal recognized by the receiver at the receiving station before any coded message can be recorded. The output of the oscillator 34 at a different frequency on the other hand, is coded through the contact 184 in order to transmit any desired information, coding being effected through conductive and non-conductive strips on the code control member 108 as will be hereafter explained.

The outputs of both oscillators may also be utilized in order to produce touch tone dialing signals. Alternatively, dialing may be effected by a pulse contact method. Where a pulse contact method is utilized during the dialing operation, contact 190 is connected through load resistor 192 to message line 16 so as to intermittently load the telephone lines thereby producing dialing pulses. If touch tone dialing is desired however, contact 190 is disconnected from resistor 192 and contact 152 is instead connected to conductor 146 in order to complete an energizing circuit for the rectifier 158 during the dialing phase of operation. The oscillators 34 and 36 are then rendered operative to produce outputs at different frequencies which are gated through the code control member 108. The output frequencies of the oscillators 34 and 36 are also changed during the dialing operation. Toward this end, the collector associated with the transistor of oscillator 34 is electrically connected through isolated coded areas on the code wheel 108, contact 194 and one of the frequency changing contacts 196, 198 and 200 to one of the capacitors 202 thereby shunted across inductor 182. Similarly, the collector of the transistor associated with oscillator 36 is electrically connected by contact 204, the code wheel 108 and contacts 206, 208 or 210 to inductor shunting capacitors 212. Therefore, for touch tone dialing purposes, all of the contacts engaged with the code control member 108 are connected in circuit except for contact 190 which is then disconnected. On the other hand, for pulse contact dialing purposes, only contacts 128, 132, 150, 184, 186, 188 and 190 are connected in circuit.

*Code control device*

Figure 5:
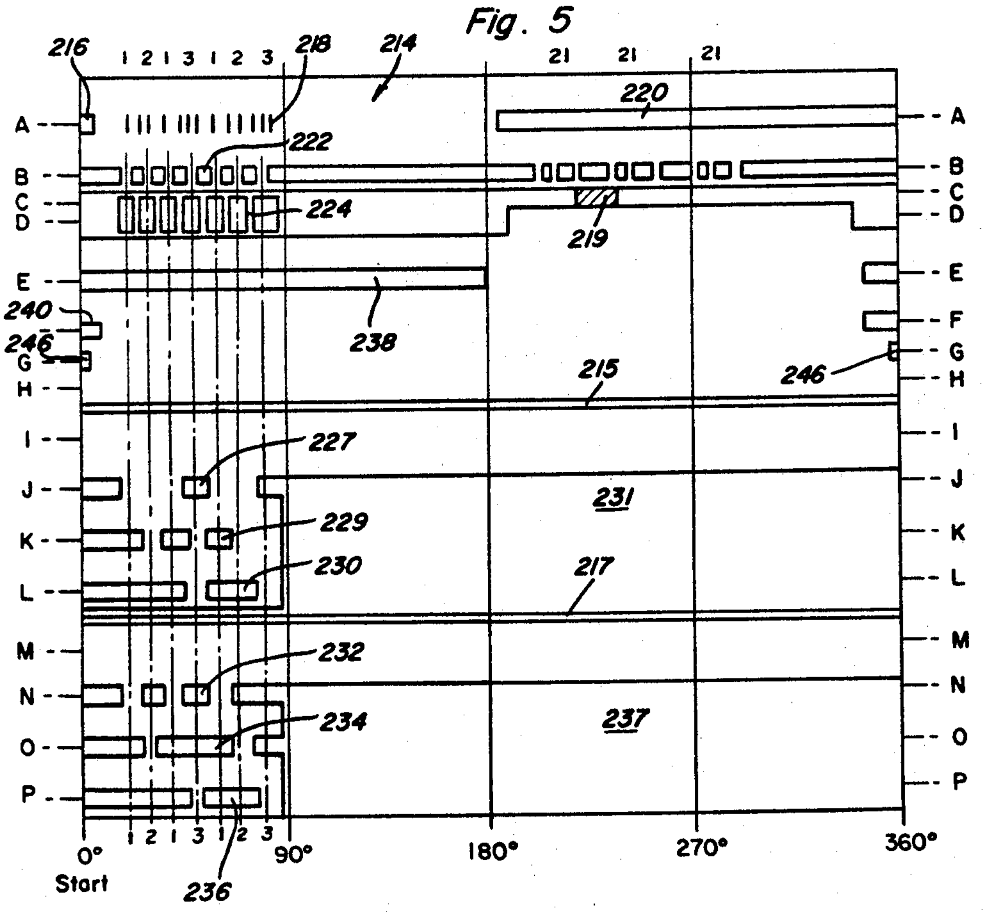
FIGURE 5 illustrates a layout of a code control device associated with the system of the present invention.
Figure 6:
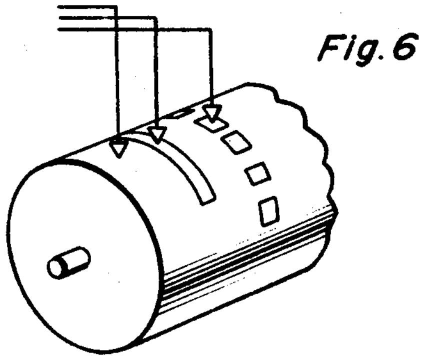
FIGURE 6 is a simplified, partial perspective view of one form of code control device.
Figure 7:
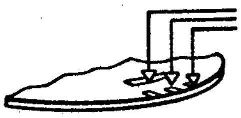
FIGURE 7 is a simplified, partial perspective view of another form of code control device.

The code control device consists of the rotatable member 108 adapted to be driven by a spring wound motor for example as hereinbefore indicated. The rotatable member may therefore be either in the form of a drum as shown in FIGURE 6 or a disk as shown in FIGURE 7. The code member whether it be a drum or a disk is provided with a code surface 214 as shown laid out in FIGURE 5 on a flat plane. The code surface is made of conductive material separated into sections insulated from each other by strips 215 and 217. Each conductive section of surface 214 is engaged by stationary contacts. Non-conductive strips of material are mounted on the surface 214 forming code tracks in alignment with the respective contacts identified by letters A through P in FIGURE 2*a*. The continuity of the section containing track C—C is preserved by a conductive portion 219 thereon as shown in FIGURE 5. Each track will therefore control the duration of the intervals during which an associated contact is opened or closed during each rotational cycle of the code control member.

Contact 190 will therefore be engaged with the code surface 214 along track A—A in FIGURE 5 for contact with non-conductive strip portion 216 in the start position of the code control member. The contact 190 then engages the conductive surface in order to load the telephone lines during a normal dial tone waiting period before the relatively narrow non-conductive dialing strips 218 are engaged to produce dialing pulses 228 as shown in FIGURE 9. Thus, dialing operation is effected through the contact 190 during the first 90° of rotation of the code control member. From 90° to 180° of the cycle, the contact 190 is engaged with the conductive surface to load the telephone lines while a circuit is completed at the receiving station. Upon elapse of a reasonable waiting period, the contact 190 engages the non-conductive strip portion 220 for the remainder of the cycle during which a coded message is dispatched from the reporting station.

If a touch tone dialing is to be utilized, the dialing signals are produced through contacts 184, 186 and 188 respectively aligned with tracks B—B, C—C and D—D in FIGURE 5. During the the dialing period therefore, the outputs of oscillators 34 and 36 are intermittently open circuited by non-conductive strip portions 222 engaged with contact 184 and narrower strip portions 224 engaged with contacts 186 and 188. Thus, the outputs of the oscillators are combined by tracks C—C and D—D before it is gated by track B—B and fed to the message lines when the aforementioned contacts are in engagement with the code surface 214 between the contact strip portions 222 and 224 in order to produce a sequence of touch tone pulses 226 as shown in FIGURE 9. In connection with FIGURE 9 it should be appreciated that the dial tone pulses 226 (in lieu of the contact pulses 228) are superimposed upon a relatively low voltage of perhaps 20 v. D.C. appearing across the telephone lines following loading thereof. The output frequencies of the oscillators are gated off by the non-conductive strip portions 222 and 224, and changed by establishing contact during the dialing operation with different combinations of contacts 196, 198, 200, 206, 208 and 210 associated with the oscillators as aforementioned. Thus, non-conductive strip portions 227, 229 and 230 are respectively aligned with contacts 196, 198 and 200 along tracks J—J, K—K and L—L as shown in FIGURE 5. Contacts 206, 208 and 210 are respectively aligned along tracks N—N, O—O and P—P with non-conductive strip portions 232, 234, and 236. Upon completion of the dialing operation, the frequency changing contacts engage non-conductive portions 231 and 237 on the code surface 214 for the remainder of the cycle.

When the contact pulse mode of operation is in effect, operation of the oscillators is limited to the coded message portion of the cycle by means of the non-conductive strip 238 along track E—E in FIGURE 5 for engagement with contact 150 during the first half of the operational cycle and during a hang-up period approaching the end of the cycle. For touch tone dialing purposes however, the non-conductive strip 240 is engaged by contact 152 aligned with track F—F in FIGURE 5. Operation of the oscillators is thereby initiated during the dialing phase of the cycle. During the second half of the cycle, both oscillators are powered through contact 150 or 152 dependent upon the dialing mode of operation. The output of oscillator 36 is applied continuously through the contact 188 engaged with the conductive surface until the hang-up period is reached. The output of oscillator 34 on the other hand is gated by the non-conductive strip aligned with line B—B and the contact 184 in engagement therewith. Thus, during the message portion of the cycle, a continuous signal 242 of one frequency is superimposed with a coded signal 244 of another frequency on the voltage appearing across the telephone lines as depicted in FIGURE 9. Should the code control device be latched by the brake element 106 in its start position once a cycle is completed, the relatively high voltage across the telephone lines is restored as also shown in FIGURE 9. Also, by way of explanation, it should be appreciated that the continuous signal 242 is superimposed upon the signal 244 although it is shown displaced therefrom in FIGURE 9 for sake of clarity. The touch tone signal 266 also depicted in FIGURE 9 while shown displaced from the low voltage line for sake of clarity, would be superimposed thereon in lieu of the pulse signal 228.

It will be apparent therefore, that the non-conductive strips mounted on the code control surface 214 program operation of the system as well as to store coded information. The code control device as described will accommodate different modes of operation in connection with dialing. The contacts 194 and 204 respectively aligned with lines I—I and M—M in FIGURE 5 are provided to render both oscillators operative for touch tone dialing purposes. A continuous connection to telephone line 18 is established through contact 128 aligned with line H—H in FIGURE 5 as long as the relay coil 90 is energized. A relatively short non-conductive strip portion 246 is aligned with line G—G in FIGURE 5 adjacent to the start position for engagement with the contact 132 connected to the telephone line 18 through switch element 120 in the cycle control device in order to establish a conductive path shunting the aforementioned connection through contact 128. This shunt path is opened by contact 132 during the hang-up period to allow engagement of the brake element 106. During the message period, a proper frequency signal received through the line amplifier by amplifier 44 may actuate switch 120 which must be manually reset after completing an emergency report.

*Condition sensing devices*

Figures 3A, 4, 8:
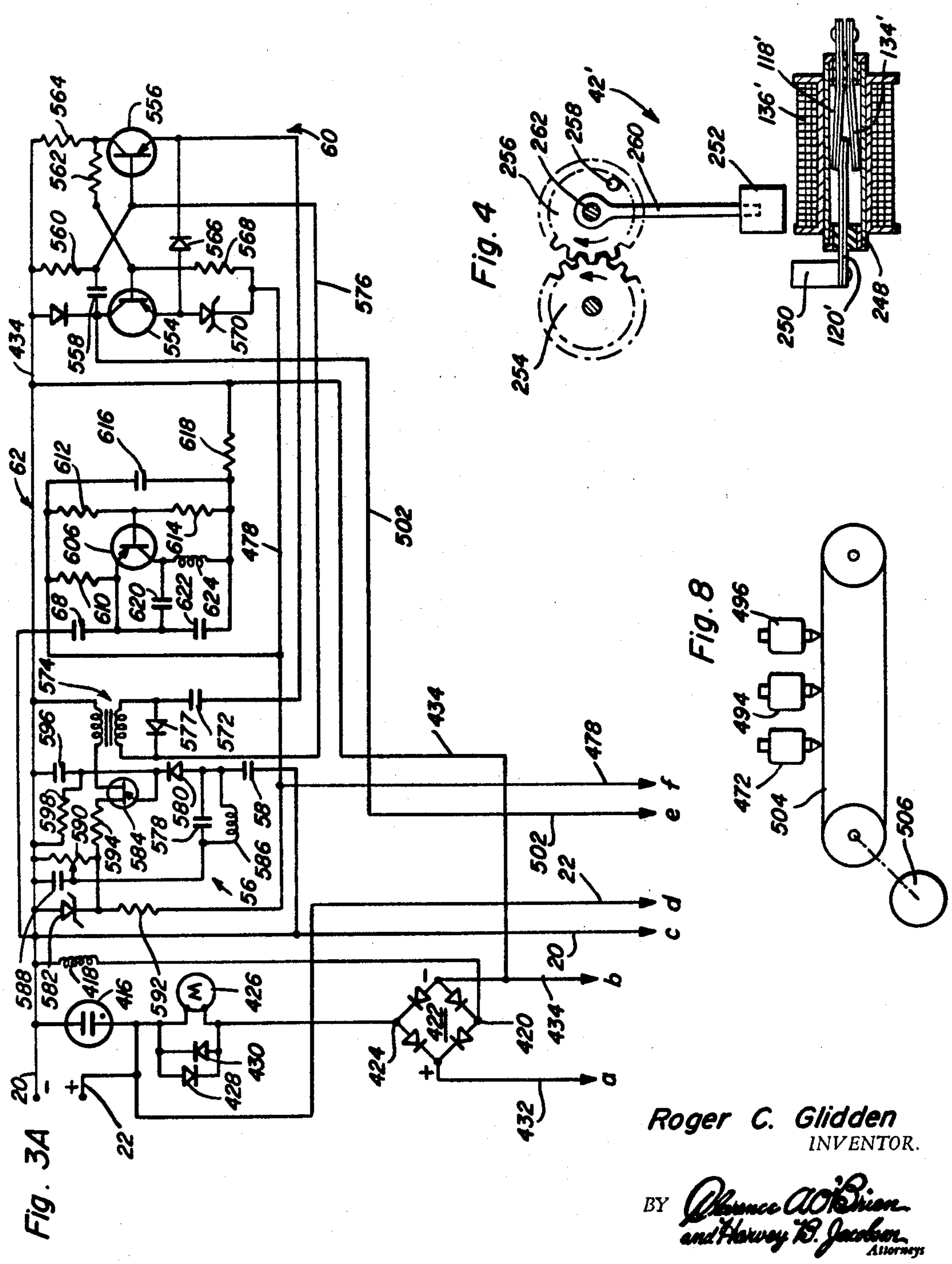
FIGURE 4 illustrates the operating parts of one form of meter reading device associated with the system of the present invention.
FIGURE 8 is a simplified diagrammatic view of the time, date and information recording apparatus associated with the system of the receiving station.

The functions performed by the cycle control device 42 when conditions of an emergency nature are monitored, are replaced by a meter reading device 42′ as shown in FIGURE 4 to monitor conditions of a non-emergency nature such as the consumption of electrical energy or gas in a private residence. Thus, there may be a separate device 42′ for each utility to be monitored and reported, each performing functions similar to those associated with the switch 120 and the latching solenoid coil 136 of the cycle control device 42 in order to provide a non-emergency signal causing energization of a brake release coil 92′. Additional relays and amplifiers similar to 90 and 44 will be required for each device 42′. A switch element 120′ associated with one meter reading device 42′ as shown in FIGURE 4 may therefore be in the form of a reed switch element displaceable between two operative positions engaged with contacts 118′ and 134′ within a fluid containing, tubular enclosure 248 forming the core of solenoid coil 136′. This type of reed switch arrangement is per se well known. Thus, the switch element 120' will remain in engagement with the contact element to which it is displaced by a magnetic bias. A bias magnet 250 is therefore mounted on the switch element for holding it in engagement with the contact 134' when the magnetic element 252 is displaced into the magnetic field of the bias magnet 250. The switch element 120' will also be displaced into engagement with contact element 134' or restored to the position illustrated in FIGURE 4 by an energizing pulse supplied to the solenoid coil 136'. The switch element 120' is adapted therefore to be displaced into engagement with contact element 134' whenever a predetermined quantity of energy or a predetermined volume of gas is consumed. The usual electric or gas meter may therefore be modified so that one of the metering dials will operate through the gears 254 and 256 to rotate an actuating pin 258 through 360° of rotation when a predetermined quantity of energy or gas has been consumed. Disposed in the path of the actuating pin 258 is a lever element 260 pivotally mounted about the stationary axis 262 of gear 256. The magnetic element 252 is suspended by this lever element. It will be apparent therefore from FIGURE 4, that when a predetermined quantity of energy or gas has been consumed the pin 258 will pivotally displace the lever element 260 in a clockwise direction from the rest position shown in FIGURE 4. When the lever element 260 is moved more than 180° by the pin 258, it swings back to its rest position bringing the magnetic element 252 into the magnetic field of the bias magnet 250 causing the switch element 120' to be displaced into engagement with the contact element 134'. As a result thereof, the switch element 120' starts dialing operation, opens the line to the telephone instrument, and connects coil 136' to an amplifier for resetting purposes. When an energizing signal is received through the telephone lines and is amplified by the amplifier, the coil 136' is pulsed so as to return the switch element 120' into engagement with the contact 118' to thereby automatically reset the system by deenergizing the solenoid coil 92' associated with the brake element 106.

Non-emergency operation of the transmitter prevents the relay coil 90 from being energized during the dialing and information transmitting phases and also disconnects the telephone instrument 126 from the lines during each operational cycle. However, whenever emergency conditions are sensed by a heat sensor the relay coil 90 overrules non-emergency operation and normal use of the telephone instrument. The sensor component 30 as shown in FIGURE 2*b* includes a plurality of heat sensors (two being shown only by way of example) and a continuity conductor 264 interconnecting the normally disengaged contacts 266 and 268, forming part of a sensor circuit through which charging current flows. Contacts 270 and 272 are respectively engaged by heat sensing switch elements 274 and 276, the switch element 274 being connected to the contact 272. The contact 270 is connected to one terminal of the telephone instrument 26, the other terminal of which is connected by conductor 278 to the relay contact 124 normally engaged by the relay switch 122 shown in FIGURE 2*a*. It will be apparent therefore, that when the relay coil 90 is energized, the relay switch 122 disconnects the telephone instrument from the telephone line 18 to which the relay switch 122 is connected. The heat sensing switch 274 or 276 on the other hand when displaced under emergency conditions into engagement with the contact 266 or 268 operates the alarm device 32 as well as to apply energizing voltage to the relay coil 90.

*Line failure logic and indicator*

Referring now to both FIGURES 2*a* and 2*b*, it will be observed that the line failure logic has associated therewith a storage battery 280, the negative terminal of which is connected through conductor 282 to the telephone line 16. Connected between the positive terminal of battery 280 and the continuity conductor 264 associated with the heat sensor component, is a charge storing capacitor 284 connected in parallel with a charge controlling resistor 286. Also, an inductor 286 connects the juncture between the conductor 264 and the capacitor 284 to the normally opened contact associated with relay switch 80 through conductor 288. Closing of the normally opened relay switch 80 is thereby operative to charge capacitor 102 through battery 280 which is connected to line 16 by conductor 282, the series connected inductor 286 and capacitor 102 filtering out telephone ringing currents from the power energizing relay coil 90. The relay switch 296 is engaged with contact 298 when polarity sensing relay coil 294 is deenergized so as to connect one terminal of the relay coil to the normally opened relay switch 82 associated with line monitoring relay coil 76 through conductor 300. The other terminal of the relay coil 294 is connected to input terminal 302 of the full wave rectifier 304 by a charge current monitoring meter 306. The terminals of relay coil 294 are also connected in parallel with a current shunting resistor 308 and diode 310 restricting energization of the relay coil 294 to current in one direction only to allow deenergization in response to reversal of line polarity during normal telephone use which would otherwise discharge the battery. The terminals of meter 306 on the other hand are connected in parallel with the diodes 312 and 314 in order to limit the flow of current therethrough in both directions. The input terminal 316 of rectifier 304 is connected to the continuity conductor 264 in the sensor circuit so as to complete therethrough a charging current path monitored by the meter 306 through which current flows in order to produce a rectified output from the rectifier 304 energizing the relay coil 318. A capacitor 320 is connected across the terminals of the relay coil in order to delay deenergization thereof. A capacitor 322 is also connected across the relay switch 296 and relay contact 298 in order to protect the contacts from chatter and subsequent rapid burn-out. Associated with the relay coil 318, is a relay switch 324 connected through conductor 282 to the telephone line 16. The relay switch 324 is therefore operative to alternatively connect the telephone line 16 to the telephone instrument 26 through contact 326 or through contact 328 and the switch elements 276 and 274 in the sensor circuit when engaged with contacts 272 and 270. An alarm operating relay switch 330 is also associated with relay coil 318 and is alternatively engageable with the relay contacts 332 and 334 to charge and discharge the capacitor 336 to which the relay switch 330 is connected. Finally, a normally closed relay switch 338 is associated with relay coil 318 operative when the relay coil 318 is deenergized to connect an intermediate positive terminal of battery 280 through diode 340 to the positive voltage line 342 associated with the operational indicator 50.

The operational indicator consists of a blocking oscillator rendered operative to drive the neon lamp 344 connected in series with inductor 346 across the output terminals of the rectifier consisting of diodes 348, 350 and filter capacitors 352 and 354. The output windings of coupling transformer 356 are respectively connected to the diodes and to the juncture between the filter capacitors through resistor 358. The input winding of transformer 356 is connected in series between the collector of transistor 360 the juncture of the negative terminal of battery 280 and the conductor 282 to telephone line 16. The oscillator driving the neon indicator lamp 344 will therefore be powered either from the battery 280 when the relay switch 338 is closed on from the telephone lines through switch 120 when engaged with contact 134. Accordingly, the positive supply line 342 is connected through the voltage reducing resistor 362 and the diode 264 to contact 134 in the cycle control device 42. A proper potential difference established between the voltage lines 282 and 342 will therefore set the oscillator into operation at a frequency determined by the RLC network 364 interconnecting the base of transistor 360 to the negative voltage line 282 in parallel with the bias resistor 366. The capacitor 414 is connected between the negative supply line 282 and the positive supply line 342 to store a charge for the oscillator. As will be hereinafter explained, the oscillator will therefore operate the neon lamp 344 to provide one type of signal whenever there is line voltage failure and to operate the indicator lamp 344 with another type of signal to signify that the transmitter is in a reporting condition.

*Alarm circuit*

The telephone line 18 is connected by conductor 368, current limiting resistor 370 and diode 372 to contact 334 so as to conduct current in a charging direction to the capacitor 336 when the relay switch 330 is engaged with contact 334. The capacitor 336 is connected by conductor 374 to one terminal of a latching solenoid coil 376, the other terminal of which is connected to the contacts normally closed by the switch section 378 of a push button type of break before make switch assembly 380. A capacitor 382 is connected across the terminals of the solenoid coil 376 to prevent energization thereof due to transient voltage. A charging circuit is completed for capacitor 336 through diode 400 connected to the telephone line 16 through conductor 282. Line 16 is also connected to the telephone instrument 26 by relay switch 324 when engaged with contact 326. When relay coil 318 is energized, switch 324 engages contact 328 to connect line 16 to the telephone 26 through the heat sensors bypassing the alarm solenoid coil 376. After the capacitor 336 has been charged, it may discharge through the solenoid coil 376 for pulsing thereof. Toward this end, the relay contact 332 engageable by the relay switch 330 connects the capacitor 336 through conductor 384 and relay switch 84 to the closed contacts of the push button switch assembly 380 connected to contact 86 associated with relay switch 84 by means of conductor 386. Thus, discharge of capacitor 336 to pulse the latching solenoid coil 376 will occur only when a normal line voltage is being monitored by the relay coil 76 displacing the relay switch 84 into engagement with relay contact 86. On the other hand, with relay switch 84 in engagement with contact 88, the capacitor 336 will discharge through resistor 338 without pulsing the solenoid coil 376.

The alarm device may be reset and operation stopped at any time under manual control by momentary actuation of the push button switch assembly 380 sequentially opening the contacts normally closed by switch section 378 and closing the normally opened switch contacts through switch sections 390 and 392. The telephone line 18 is therefore also connected through resistor 370 and diode 394 to capacitor 396 (FIGURE 2*b*) for charging thereof through diodes 398 and 400 connecting the capacitor 396 to the negative voltage line 282. Upon closing of the switch section 390, the solenoid coil 376 is connected in parallel with diode 398. When the switch section 392 is finally closed, it establishes a conductive path to the juncture of diode 400 and solenoid coil 376 so that the capacitor 396 may discharge therethrough.

Each time the solenoid coil 376 is pulsed and latched in response to actuation of the heat sensor component, it operates an alarm sounding mechanism. As shown by way of example diagrammatically in FIGURE 2*b*, the solenoid coil when latched opens a valve 402 to admit fluid under pressure from a storage tank 404 to a nozzle device 406 in order to operate the horn 408. Once the alarm is set into operation, it must be manually shut off by reset of the latched solenoid as aforementioned. It will be apparent therefore, that the alarm device triggered into operation only under emergency conditions requires manual reset as distinguished from the automatic reset aforementioned in connection with the monitoring of non-emergency conditions by a meter reading device.

*Transmitter operation*

Under normal conditions while the reporting station is awaiting a call or use, a relatively high voltage will appear across the telephone lines 16 and 18. This high voltage will be applied to the input terminals of the rectifier 74 in order to maintain the line monitoring relay coil 76 energized. Thus, in the quiescent condition of the transmitter, the normally opened relay switches 80 and 82 will be closed while the relay switch 84 will be engaged with relay contact 86. Closing of the relay switch 82 connects the telephone line 16 through conductors 282 and 300 to the relay contact 298 engaged by relay switch 296 in the line failure logic 48 in order to energize polarity sensing relay coil 294. Switch 296 then engages contact 292 establishing a different path from line 16 to the relay coil 294 through battery 280 and diode 290 in order to maintain the battery in a charged condition. At the same time, the conductor 264 interconnecting the capacitor 284 and the rectifier 304, is connected by inductor 286 and the closed relay switch 80 to the rectifier 96 shunted by bypass capacitor 102 (FIGURE 2*a*) in series with relay switch 100. The capacitor 102 is in turn connected through resistor 116 and the switch element 120 to the telephone 18. Under these conditions, charging current will be conducted through the relay coil 294, monitoring meter 306 and rectifier 304 to charge capacitor 102 and to energize relay coil 294 and relay coil 318, assuming that the polarity of the voltage across the telephone lines 16 and 18 is as shown in FIGURE 2*a*. Should the voltage across the telephone lines drop below charging value, the relay coil 294 will be deenergized thereby disconnecting the battery 280 from the charging circuit which is continuously monitored by the meter 306. The relay coil 294 will also be deenergized in response to an incoming call causing a reversal in polarity of the voltage across the telephone lines in which case the telephone line 16 will be connected through relay switch 82, relay switch 296 and diode 310 to the series connected meter 306 and rectifier 304 in order to maintain the relay coil 318 energized. It will be apparent therefore, that the relay coil 294 is operative to sense low voltage or a reversal in voltage polarity across the telephone lines in order to maintain the relay coil 318 energized prior to reporting operation of the transmitter and also to accommodate charging of the battery 280 as long as a relatively high voltage of proper polarity appears across the telephone lines.

In the quiescent condition therefore, the telephone instrument 26 will be connected across the telephone lines through relay switch 122 in engagement with relay contact 124 and through relay switch 324 in engagement with relay contact 328 connected to the telephone through the heat sensor switches 276 and 274, respectively engaging contacts 272 and 270. The transmitter remains in its standby condition even though an incoming call causes a reversal in the polarity of the line voltage across the telephone lines because of the action of relay coil 294 as aforementioned.

When a non-emergency condition is to be reported, the switch element 120′ in a meter reading device 42′ will be displaced into engagement with contact 134′ so as to apply energizing voltage from the telephone lines to solenoid coil 92′ releasing brake element 106. The code wheel member 108 may then undergo an operational cycle similar to that hereinbefore described in order to dial said report to a non-emergency receiving station such as the billing center of a public utility. Additional coded tracks and contacts (not shown) will therefore be provided for this purpose. Also, an additional relay (not shown) operationally similar to relay 90 will open the telephone line connection, connect resetting coil 136′ to an amplifier similar to amplifier 44, properly connect the contacts associated with the coded tracks on the code wheel 108 to dial and report to the non-emergency receiving station and change the code frequency of oscillator 34 by connecting an additional capacitor 202 thereto. Thus, by properly programming the receiving station, a frequency tone is fed to the resetting coil 136' after a non-emergency report is completed to reset the switch 120' to its normal position engaging contact 118'.

Should an emergency condition be sensed by actuation of the heat sensor switch 274 or 276, the telephone instrument is immediately disconnected from the telephone lines. A negative voltage is then applied directly to the inductor 286 from the negative voltage line 282 through the heat sensor switch 274 or 276 engaged with contact 266 or 268 thereby energizing the rectifier 96 through the closed relay switch 80 directly connected to the input terminal 94 of the rectifier 96. The relay coil 90 and brake release solenoid 92 are therefore energized and once energized are maintained energized through relay switch 100 directly connecting the telephone line 16 to the input terminal 94 with the telephone line 18 being connected through resistor 116 and switch element 120 to the other input terminal 98. Energization of the relay coil 90 also connects the telephone line 18 through relay switch 122 to contact 128 engaged with the conductive surface of the code control member. Accordingly, after the code control member moves a short distance away from its start position, the relay holding circuit is completed through the contact 132 in order to prevent deenergization of the relay coil 90 during the ensuing operation should the switch element 120 be subsequently actuated in response to a proper frequency signal from the receiving station. The relay switch 122 also disconnects telephone line 18 from the telephone instrument 26 so as to prevent any reconnection of the telephone during the message transmitting period.

During the dial tone waiting period, the telephone lines are loaded either by resistor 192 connected across the lines through contacts 190 and 128 engaged with conductive portions of the code control member 108 or the telephone lines may be loaded by engagement of the conductive surface during the dial tone waiting period by contacts 128 and 152 thereby connecting the rectifier 158 across the lines in series with resistor 160. Pulse contact or touch tone dialing may then ensue.

After completing the dialing phase of the cycle, the code control member will power the oscillators 34 and 36 through contact 150 if they had not already been powered through contact 152. A continuous output 242 from oscillator 36 is then applied to the lines at one frequency through contact 188 whereas a coded output 244 is applied to the telephone lines at another frequency from oscillator 34 through contact 184 as hereinbefore described in order to transmit coded information to the receiving station. During the hang-up period approaching the end of the rotational cycle of the code control member 108, if no response is received from the receiving station to report of a monitored condition, the relay coil 90 and the brake release solenoid 92 will remain energized to hold the brake element 106 retracted as the code control member reaches its start position. Recycling therefore occurs until the energy of the motor driving the code control member 108 is exhausted. On the other hand, if a cycle control signal of proper frequency is received before the hang-up period, this signal is applied from telephone line 18 through relay switch 122, relay contact 126 and contact 128, code wheel member 108, and contact 150 to the input coupling capacitor 46 of the amplifier 44. The output of the amplifier is applied to the solenoid coil 136 in order to actuate the switch element 120 before the end of the hangup period. The switch element 120 then opens the holding circuit for the relay coil 90 and brake released solenoid 92 when contact 132 engages non-conductive strip 246 at the end of the emergency reporting cycle. If a non-emergency reporting cycle had been completed, the cycle control signal in actuating the solenoid coil 136', would instead automatically reset its associated switch element 120' as described in connection with FIGURE 4. A selenium diode protector 410 is connected across the switch element 120 and contact 118 to prevent burnout. Similarly, a selenium diode protector 412 is connected across the relay switch 100 and relay contact 114.

As hereinbefore explained, during normal quiescent conditions, the capacitor 336 is connected across the telephone lines in series with resistor 370, diodes 372 and 400 through the relay switch 330 engaged with contact 334 and the push button switch assembly 380 in its normal position illustrated in FIGURE 2B. When an emergency condition is being sensed by the heat sensor component causing relay switch 330 to engage contact 332, capacitor 336 may discharge through the latching solenoid coil 376 in series with relay switch 84 engaging contact 86 and closed switch 378 of the push button switch assembly 380 to operate the alarm device 32. Operation of the alarm device may be stopped and reset at any time desired under manual control by actuation of the push button switch assembly 380 as aforementioned. In the latter cases, the energy for resetting the alarm device is derived from the telephone lines and stored in capacitor 396. Should however, there be any line failure, and the heat sensor component 30 actuated, the capacitor 284 will be charged through the solenoid coil 376 in order to trigger operation of the alarm device by energy derived from the battery 280. Accordingly, operation of the alarm device is assured regardless of whether or not there is power available from the telephone lines. The availability of energy from the battery 280 is assured as hereinbefore indicated by virtue of the fact that it is charged during normal operation.

Whenever there is a line failure, all of the relays are deenergized as aforementioned so that normally closed relay switch 338 associated with relay coil 318 supplies a low positive voltage from battery 280 through diode 340 to the positive voltage line 342 of the blocking oscillator shown in FIGURE 2*b*. The capacitor 414 is then charged until an operating voltage is established in line 342 to operate the oscillator. During operation of the oscillator, capacitors 352 and 354 periodically charge and discharge through the neon lamp 344. Thus, the indicator 50 will blink or illuminate lamp 344 intermittently at a relatively low rate to signify that there is line voltage failure. A higher positive voltage may also be applied to the positive voltage line 342 following the report of an emergency condition so as to more rapidly operate the indicator 50 producing what appears to be a steady light readily distinguishable from the intermittent operation produced during line voltage failure. Operation of the indicator 50 will therefore not only signify line voltage failure but will also indicate that an emergency operation has been reported.

*Receiving amplifier*

Figure 3B:
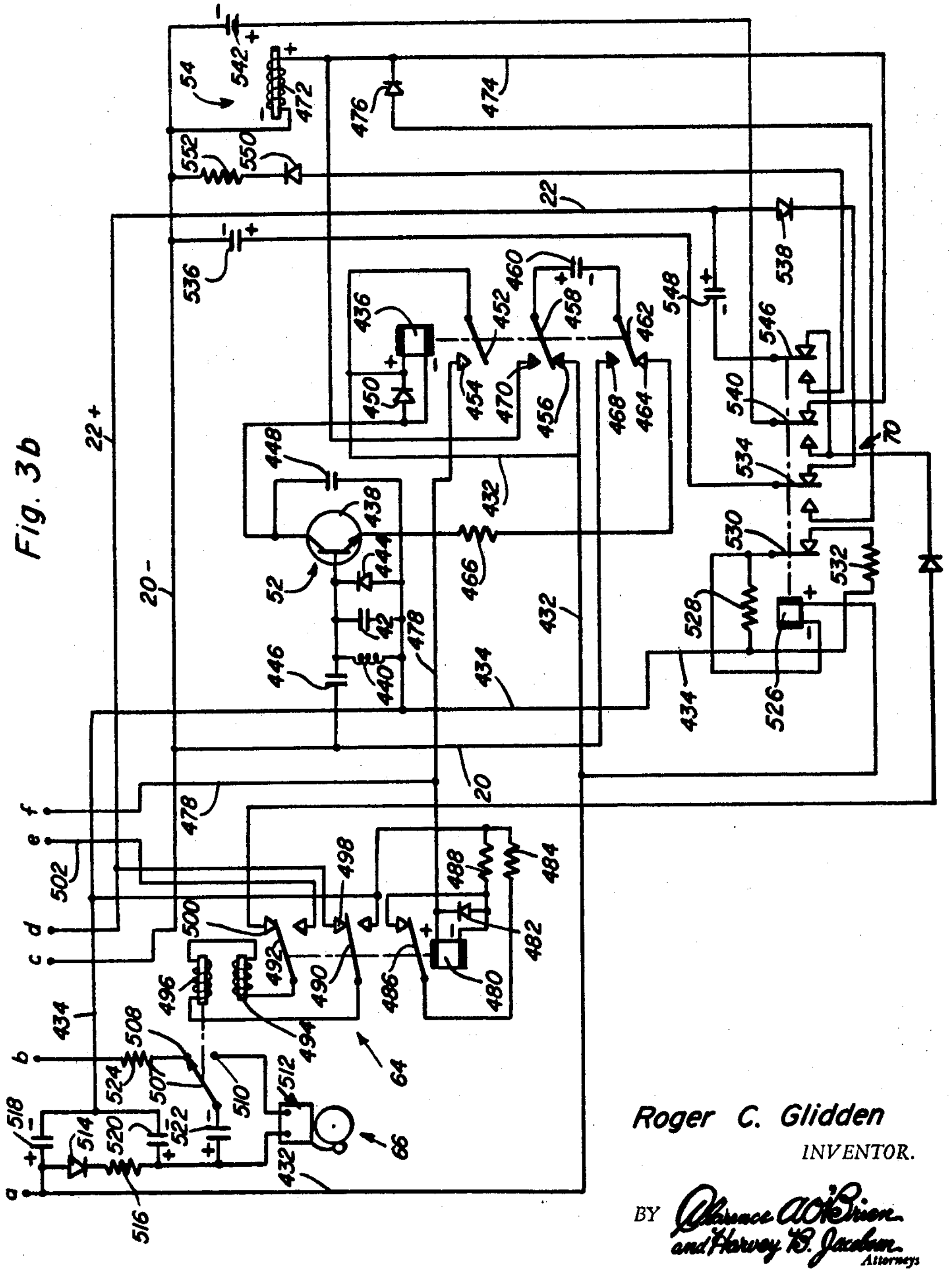

Referring now to FIGURES 3*a* and 3*b*, it will be observed that the telephone lines 20 and 22 at the receiving station have a voltage limiting neon lamp 416 connected thereacross. Telephone line 20 is connected through inductor 418 to input terminal 420 of the full wave rectifier 422, the other input terminal 424 of which is connected to the other telephone line 22 through a current monitoring meter 426 in parallel with meter current limiting diodes 428 and 430. A rectified output is thereby established across the D.C. voltage lines 432 and 434. The negative output voltage line 434 from the rectifier 422 is connected to the amplifier circuit 52 as shown in FIGURE 3*b* while the positive voltage line 432 is connected to one terminal of the relay coil 436 associated with the amplifier, the other terminal thereof being connected to the collector of the NPN type transistor 438 in the amplifier circuit. The negative voltage line 434 is connected to the emitter of transistor 438 in order to establish a negative potential thereon and charge capacitor 448 connected across the emitter and collector. A frequency tuned base-emitter circuit is established by inductor 440 and capacitor 442 in parallel with the voltage limiting diode 444 in order to restrict operation of the amplifier to a signal within a narrow frequency range. The input signal to the base of transistor 438 is applied through signal coupling capacitor 446 connected to the telephone line 20. It will be apparent therefore, that an input signal of proper frequency applied to the base of transistor 438 will render the transistor 438 conductive to energize the relay coil 436. The signal to which the relay coil 436 thereby responds is that produced by the oscillator 36 during the message transmitting phase of operation of the transmitter 12, as aforementioned. A diode 450 is connected across the terminals of relay coil 436 in order to prevent an increase in collector voltage during transistor cutoff.

Associated with the relay coil 436, is a normally opened relay switch 452 adapted to apply the positive voltage from the rectifier output line 432 to the relay contact 454 when the relay coil 436 is energized. The positive voltage line 432 is also connected to relay contact 456 normally engaged by relay switch 458 so as to connect the positive voltage line to one side of capacitor 460 the other side of which is connected to relay switch 462 normally engaged with relay contact 464 which is connected to the negative voltage line 434 through resistor 466. It will be apparent therefore, that when the relay coil 436 is deenergized as shown in FIGURE 3*b*, the capacitor 460 will be in a charged condition as long as a voltage appears across the telephone lines which is rectified by the rectifier 422. When the relay coil 436 is energized, the negative side of the capacitor 460 is connected to the telephone line 20 through relay contact 468 while the positive side of the capacitor is connected through relay switch 458 to relay contact 470.

*Recording circuits*

The relay contact 470 associated with relay coil 436 aforementioned, is connected to one terminal of the solenoid coil 472 in the time and date recorder 54. The other terminal of the solenoid coil 472 is connected to the telephone line 20. The solenoid coil 472 is also connected through conductor 474 and diode 476 to the line failure logic 70 for purposes to be hereafter explained.

The relay contact 454 associated with the relay switch 452 of relay coil 436 is connected to a line 478 to which positive voltage is applied from the rectifier 422 upon closing of relay switch 452. The positive voltage line 478 is connected to one terminal of relay coil 480 associated with the code recorder component 64. The negative voltage line 434 from the rectifier 422 on the other hand is connected to the other terminal of relay coil 480 through resistor 484 and the normally closed relay switch 486 when the relay coil 480 is deenergized and through resistor 488 when the relay coil 480 is energized. A diode 482 is also connected across the terminals of the relay coil 480 in order to limit voltage induced by opening of the coil circuit. Interconnected between the relay switches 490 and 492 associated with the relay coil 480, are a pair of series connected solenoid coils 494 and 496. Thus, when the relay coil 480 is deenergized, the relay switches 490 and 492 respectively engage the contacts 498 and 500 to connect the solenoid coils 494 and 496 to the telephone line 22 and disconnect them from line 502 to the multivibrator 60. The solenoid coils 494 and 496 are pulsed through the multivibrator 60 as will be hereafter explained in order to record the coded information transmitted to the receiving station from the reporting station.

The time information recorded by pulsing of the solenoid coil 472 and the other information recorded by pulsing of the solenoid coils 494 and 496, may be effected in any suitable manner. For example, as diagrammatically shown in FIGURE 8, an elongated tape 504 could be moved at a constant rate by means of a timer motor 506 at the receiving station in alignment with punches actuated by the solenoid coils 472, 494 and 496. The location of a marking produced by pulsing of the solenoid coil 472 will indicate by indicia on the tape 504 the time at which the solenoid coil 472 was pulsed. The markings produced on the tape by the solenoid coils 494 and 496 on the other hand in accordance with a pulse sequence pattern will provide a recording of the coded information on the tape.

Whenever the code recording solenoid coils 494 and 496 are pulsed, switch 507 is momentarily displaced from engagement with contact 508 into engagement with contact 510 in the alarm circuit 66. The alarm circuit includes a bell or buzzer 512 one terminal of which is connected to the normally opened contact 510 and the other terminal is connected to the positive voltage line 432 through the diode 514 and current limiting resistor 516. However, in the normal position of switch 507 as shown in FIGURE 3*b*, the bell 512 is open circuited while the storage capacitors 518 and 520 store charges from rectifier 422 through the negative voltage line 434 rapidly transferring charge to capacitor 522 through resistor 524. It will be apparent therefore, that upon momentary displacement of the switch 507 into engagement with contact 510, capacitor 522 will discharge through the bell 512 in order to sound an alarm.

*Line failure logic*

As shown in FIGURE 3*b*, relay coil 526 has one terminal connected to the positive voltage line 432 and the other terminal connected to the negative voltage line 434 through resistor 528 shunted by normally closed relay switch 530 and resistor 532. Accordingly, the relay coil 526 will remain energized as long as there is line voltage across the telephone lines 20 and 22. When energized, relay coil 526 will displace relay switch 540 from the position shown in FIGURE 3*b* to connect the capacitor 542 across the telephone lines 20 and 22 in series with diode 544 and solenoids coils 494 and 496 through relay switches 490 and 492 to charge capacitor 542. Also, relay switch 546 will be displaced by energization of relay coil 526 from the position shown to connect capacitor 548 across the telephone lines in series with diode 550 and resistor 552. The capacitors 542 and 548 are thereby charged to subsequently effect pulsing of the recording solenoid coils 472, 494 and 496 in accordance with the voltage and signal condition of the telephone lines as will be hereafter explained.

*Signal producing circuits*

As hereinbefore indicated, the code recording solenoid coils 494 and 496 are pulsed by the output signal line from the multivibrator 60 which is of the monostable type including a pair of PNP types of transistors 554 and 556. The output collector of transistor 554 is coupled by capacitor 558 to the base of transistor 556 to which a bias voltage is applied from the negative voltage line 434 through base resistor 560. The base of transistor 554 on the other hand is coupled through resistor 562 to the collector of transistor 556 connected through load resistor 564 to the negative voltage line 434. The emitters of the transistors 554 and 556 are interconnected by diode 566 and the transistor 554 rendered non-conductive by positive voltages respectively applied to the base and emitter of transistor 554 through bias resistor 568 and Zener diode 570 connected to the positive voltage line 478 to render the multivibrator operative when the normally opened relay switch 452 in the amplifier circuit is closed by energization of relay coil 436. The multivibrator 60 is triggered to its unstable state producing a negative output pulse at the collector of transistor 554 by a positive trigger pulse applied to the emitter of transistor 556 through signal coupling capacitor 572 from the trigger component 56.

The trigger component as shown in FIGURE 3*a* includes an output transformer 574, connected through coupling capacitor 572 to the emitter of transistor 556 as aforementioned and through conductor 576 to the base of transistor 556. The trigger pulse is clipped by the diode 577 connected across the terminals of the transformer output winding. The input winding of the transformer 574 is connected between the negative voltage line 434 and the output electrode of the uni-junction switching transistor 578. The input control electrode of the switching device 578 is connected through diode 580 and signal coupling capacitor 58 to the telephone line 20 so as to switch the device 578 on when a proper input signal is applied to the telephone lines. Operation of the trigger component is limited to a predetermined signal frequency by means of the tank circuit consisting of the parallel connected capacitor 584 and inductor 586 connecting the input coupling capacitor 58 to capacitor 588. The signal amplitude to which the trigger component responds may be adjusted through the voltage dividing potentiometer 590 connected in series with resistor 592 between the negative voltage line 434 and the positive voltage line 478. A Zener diode 582 is connected across potentiometer 590 to clamp the voltage established thereacross and regulate the voltage across capacitors 588 and 596 established by the position of the potentiometer wiper arm. Additional charge is stored by capacitor 596 when a voltage rectified by diode 580 is applied thereto when a signal of proper frequency is applied across the aforementioned tank circuit. Thus, when the device 578 is switched on, it will establish a conductive path through resistor 594 to the input winding of transformer 574 discharging the capacitor 596 connected between the negative voltage line 434 and the input electrode of the switching device 578 shunted by the charge controlling resistor 598 to shape the output trigger pulse. It will be apparent therefore that the signal 600 as depicted in FIGURE 10 will be converted by the trigger component 56 into trigger pulses applied to the multivibrator 60 through which the multivibrator is temporarily switched to its unstable state producing a positive output pulse in output line 502 connected to the code recorder component 64. Coded information is thereby recorded.

At the same time that the coded signal 600 is received across telephone lines 20 and 22, a continuous signal 602 is superimposed thereon as also shown in FIGURE 10. This signal maintains amplifier 52 operative to hold relay coil 436 energized. The output signal 608 from the oscillator 62 which is energized at the same time that the trigger and multivibrator components are energized under control of the amplifier relay coil 436 is applied across the lines 20 and 22 and will appear across the transmitter lines 16 and 18. Thus, telephone line 20 is coupled to the output emitter of transistor 606 in the oscillator circuit through coupling capacitor 68 so that the oscillator applies a cycle control signal 608 to the telephone lines at a frequency recognized by the amplifier 44 in the transmitter as hereinbefore described. Positive bias for the emitter of transistor 606 is furnished by the positive voltage line 478 through resistor 610 while proper bias is established for the base of the transistor through the voltage dividing resistors 612 and 614 connected in series between the positive voltage line 478 and negative voltage line 434 through resistor 618, with the resistors 612 and 614 being connected in parallel with the capacitor 616. A negative bias is applied to the collector of the transistor 606 from the negative voltage line through the resistor 618. Oscillation is sustained by the feedback capacitor 622 connected in series with capacitor 620 across the inductor 624 to form a tank circuit determining the output frequency of the oscillator.

*Receiver operation*

When the receiving station is in a normal quiescent condition, a relatively high voltage of one polarity as illustrated in FIGURES 3*a* and 10 appears across the telephone lines 20 and 22 causing energization of the line monitoring relay coil 526 so as to displace the relay switches associated therewith to positions opposite to those shown in FIGURE 3*b*. The capacitor 548 is then connected across the telephone lines through diode 550 and resistor 552 in order to store a charge. A charge is also stored in capacitor 542 since it is then connected across the telephone lines 20 and 22 in series with diode 544 through the solenoid coils 494 and 496 through the relay switches 540, 490 and 492. Also in the quiescent condition of the receiver, the capacitor 460 is connected through relay switch 458 to the positive voltage line 432 and through relay switch 462 to the negative voltage line 434 through resistor 466. Thus, the capacitor 460 will be in a charged condition when the receiving station is dialed by a transmitter from a reporting station.

When an incoming call to the receiving station is initiated from the reporting station, the polarity of the voltage across the telephone lines 20 and 22 may be reversed as depicted in FIGURE 10 in one form of telephone system. Capacitors 548 and 542 remain charged and cause no pulsing of the recording solenoids. After a short pause, the continuous signal 602 is applied to the telephone lines originating from the transmitter. This signal when recognized by the amplifier 52 as hereinbefore described energizes the relay coil 436 for the duration of the signal. Energization of the relay coil 436 connects the charge capacitor 460 across the solenoid coil 472 causing the capacitor to discharge and thereby pulse the solenoid coil 472. The solenoid coil 472 is thereby operative to record the time at which reporting operation begins. Also, as long as the signal 602 persists during subsequent reporting operation, relay coil 436 prevents recharging of capacitor 460 and pulsing of solenoid 472.

At the same time that the solenoid coil 472 is pulsed by energization of relay coil 436, normally opened relay switch 452 closes to connect the positive voltage line 432 to the voltage line 478 in order to power the trigger, multivibrator and oscillator components as hereinbefore described. The coded signal 600 which then appears across the telephone lines 20 and 22 is fed to the trigger component 56 through which the multivibrator 60 is operated to provide a train of energizing pulses to the code recorder component 64. The relay coil 480 is energized at the same time that the trigger, multivibrator and oscillator components are powered so as to connect the code recording solenoid coils 494 and 496 to the output line 502 of the multivibrator 60. Accordingly, the solenoid coils 494 and 496 will record the train of code pulses. Switch 507 is momentarily displaced into engagement with contact 510 discharging the capacitor 522 in order to sound the bell 512 once each time the code recorder is operated. While the information is being recorded, the output of oscillator 62 is applied to the telephone lines so as to automatically condition the transmitter for termination of operation at the end of a cycle as hereinbefore described.

In the event there is line voltage failure, the line monitoring relay coil 526 will be deenergized so that the relay switches associated therewith will return to the positions illustrated in FIGURE 3*b*. Capacitor 542 will then be connected across the solenoid coil 472 by means of relay switch 540 causing the capacitor 542 to discharge through the coil 472 to operate the time and date recorder 54. Thus, the time at which line voltage failure has occurred will be recorded. At the same time, the capacitor 548 is connected across the solenoid coils 494 and 496 through relay switch 546 in series with diode 544 in a separate circuit causing the capacitor 548 to discharge through the solenoid coils 494 and 496 thereby identifying on the recording medium that line voltage failure has occurred and cause advancement of the recording medium. Also, capacitor 536 is then connected across the telephone lines 20 and 22 through relay switch 534 in series with diode 538 so that when line voltage is regained, capacitor 536 will be rapidly charged. On regaining line voltage, the capacitor 536 is charged and the line monitoring relay coil 526 thereafter energized once again so that the charged capacitor 536 will discharge through the solenoid coil 472 in order to pulse this solenoid coil and record the time at which line voltage was regained. It will be apparent therefore that the time recording solenoid coil 472 will be pulsed at the beginning of an event whether it be a reporting event or line voltage failure. Also, in the case of line voltage failure, the time that the event was terminated will be recorded. Further, the receiver is automatically reset and is also operative to automatically stop the transmitter from which any report originates. False triggering of the receiver is also prevented because of the use of a continuous frequency signal dispatched from the transmitter that is recognized by the amplifier 52 before any information may be recorded.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a telephone communication system including message lines adapted to be loaded at a reporting station having a telephone instrument to produce a change in voltage across the message lines at the reporting station, condition monitoring means at the reporting station including emergency and non-emergency signalling means, automatic dialing means connected to the message lines at the reporting station rendered operative for establishing communication with a receiving station, means connecting said emergency signalling means to the automatic dialing means for rendering the same operative while disconnecting the telephone instrument from the message lines, means connecting the non-emergency signalling means to the automatic dialing means for rendering the same operative while disconnecting the telephone instrument from the message lines only when not in use, and signal producing means responsive to operation of the dialing means for transmitting information through the message lines to the receiving station when interconnected with the reporting station.

2. The combination of claim 1 including time indicating means connected to the message lines at the receiving station for recording changes in voltage across said lines, message recording means connected to said message lines at the receiving station in response to operation of said signal producing means at the reporting station for recording the information transmitted by the signal producing means, and cycle control means connected to the message lines at the receiving station for terminating operation of the dialing means at the reporting station in response to reception of the information.

3. The combination of claim 2 including energy storage means at the reporting station, charging circuit means connecting said message lines to the energy storage means for charging thereof while the dialing means is inoperative, alarm means connected to the emergency signalling means for operation by energy supplied from the message lines, and line failure detecting means connected to the message lines for energizing the alarm means from the energy storage means in response to removal of voltage across the message lines when an emergency condition is sensed by the condition monitoring means.

4. The combination of claim 3 including operational indicating means connected to the energy storage means and the line failure detecting means for signifying inoperativeness of the dialing means during operation of the alarm means.

5. The combination of claim 4 wherein said signal producing means includes, an oscillator, contact means controlled by the dialing means energizing the oscillator from the message lines, and coding means controlled by the dialing means for gating the output of the oscillator applied to the message lines.

6. The combination of claim 5 including a second oscillator connected to said contact means for applying a continuous output to the message lines at the reporting station, and frequency tuned amplifier means connected to the message lines at the receiving station for rendering the message recording means operative only in response to a signal at the output frequency of said second oscillator.

7. The combination of claim 6 wherein said dialing means includes a movable member, brake means for holding said member stationary at a predetermined position, brake release means connected to the signalling means for initiating movement of the member from said position thereof, frequency control means connected to said oscillators for changing the output frequencies thereof in a predetermined sequence, and means responsive to said movement of the member for gating the output of said oscillators in accordance with said sequence of frequencies.

8. The combination of claim 7 wherein said time indicating means includes a time recording device connected to the frequency tuned amplifier means for recording reception of said continuous output of the second oscillator and line failure logic means connecting the message lines to the time recording device for recording loss and regain of voltage across said message lines.

9. The combination of claim 1 including energy storage means at the reporting station, charging circuit means connecting said message lines to the energy storage means for charging thereof while the dialing means is inoperative, alarm means connected to the emergency signalling means for operation by energy supplied from the message lines, and line failure detecting means connected to the message lines for energizing the alarm means from the energy storage means in response to removal of voltage across the message lines when an emergency condition is sensed by the condition monitoring means.

10. The combination of claim 9 including operational indicating means connected to the energy storage means and the lines failure detecting means for signifying inoperativeness of the dialing means during operation of the alarm means.

11. The combination of claim 1 wherein said signal producing means includes, an oscillator, contact means controlled by the dialing means energizing the oscillator from the message lines, and coding means controlled by the dialing means for gating the output of the oscillator applied to the message lines.

12. The combination of claim 11 including time indicating means connected to the message lines at the receiving station for recording changes in voltage across said lines, message recording means connected to said message lines at the receiving station in response to operation of the signal producing means at the reporting station for recording the information transmitted by the signal producing means, and cycle control means connected to the message lines at the receiving station for terminating operation of the dialing means at the reporting station in response to reception of the information.

13. The combination of claim 12 including a second oscillator connected to said contact means for applying a continuous output to the message lines at the reporting station, and frequency tuned amplifier means connected to the message lines at the receiving station for rendering the message recording means operative only in response to a signal at the output frequency of said second oscillator.

14. The combination of claim 13 wherein said time indicating means includes a time recording device connected to the frequency tuned amplifier means for recording reception of said continuous output of the second oscillator and line failure logic means connecting the message lines to the time recording device for recording loss and regain of voltage across said message lines.

15. The combination of claim 14 wherein said dialing means includes a movable member, brake means for holding said member stationary at a predetermined position, brake release means connected to the signalling means for initiating movement of the member from said position thereof, frequency control means connected to said oscillators for changing the output frequencies thereof in a predetermined sequence, and means responsive to said movement of the member for gating the output of said oscillators in accordance with said sequence of frequencies.

16. In combination with a telephone communication system including message lines adapted to be loaded at a reporting station having a telephone instrument to produce a change in voltage across the message lines by loading at the reporting station, automatic dialing means connected to the message lines at the reporting station and rendered operative for establishing communication with a receiving station, signal producing means responsive to operation of the dialing means for transmitting information through the message lines to the receiving station when interconnected with the reporting station, time indicating means connected to the message lines at the receiving station for recording changes in voltage across said lines, message recording means connected to said message lines at the receiving station for recording the information transmitted by the signal producing means, and cycle control means connected to the message lines at the receiving station for terminating operation of the dialing means at the reporting station in response to reception of the information.

17. The combination of claim 16 including an oscillator connected to said contact means for applying a continuous output to the message lines at the reporting station, and frequency tuned amplifier means connected to the message lines at the receiving station for rendering the massage recording means operatively only a response to a signal at the output frequency of said oscillator.

18. The combination of claim 17 wherein said time indicating means includes a time recording device connected to the frequency tuned amplifier means for recording reception of said continuous output of said oscillator and line failure logic means connecting the message lines to the time recording device for recording loss and regain of voltage across said message lines.

19. The combination of claim 16 wherein said signal producing means includes, an oscillator, contact means controlled by the dialing means energizing the oscillator from the message lines, and coding means controlled by the dialing means for gating the output of the oscillator applied to the message lines.

20. In combination with a telephone communication system including message lines adapted to be loaded at a reporting station, emergency signalling means, automatic dialing means connected to the message lines, means connecting said emergency signalling means to the automatic dialing means for rendering the same operative, energy storage means at the reporting station, charging circuit means connecting said message lines to the energy storage means for charging thereof while the dialing means is inoperative, alarm means connected to the emergency signalling means for operation thereof only in response to an emergency condition by energy supplied from the message lines, and line failure detecting means connected to the message lines for supplying energy to the alarm means from the energy storage means upon removal of voltage across the message lines.

References Cited

UNITED STATES PATENTS

| | | | |
|---|---|---|---|
| 3,233,232 | 2/1966 | Brennon | 179—5 X |
| 3,268,662 | 8/1966 | Jackel. | |
| 3,301,957 | 1/1967 | Germond et al. | 179—3 |
| 3,327,060 | 6/1967 | Hogan | 179—5 |

ROBERT L. GRIFFIN, *Primary Examiner.*

J. T. STRATMAN, *Assistant Examiner.*